United States Patent
Vertes et al.

(10) Patent No.: US 9,590,796 B2
(45) Date of Patent: Mar. 7, 2017

(54) ACCESS NETWORK FOR DIGITAL TELECOMMUNICATIONS SYSTEM AND METHOD OF DIGITAL TELECOMMUNICATIONS

(71) Applicant: Sigfox, Labege (FR)

(72) Inventors: Marc Vertes, Saint Lys (FR); Cèdric Artigue, Toulouse (FR); Christophe Fourtet, Pompignan (FR)

(73) Assignee: SIGFOX (FR)

( * ) Notice: Subject to any disclaimer, the term of this patent is extended or adjusted under 35 U.S.C. 154(b) by 113 days.

(21) Appl. No.: 14/356,830

(22) PCT Filed: Nov. 9, 2012

(86) PCT No.: PCT/EP2012/072319
§ 371 (c)(1),
(2) Date: May 7, 2014

(87) PCT Pub. No.: WO2013/068559
PCT Pub. Date: May 16, 2013

(65) Prior Publication Data
US 2014/0321451 A1    Oct. 30, 2014

(30) Foreign Application Priority Data
Nov. 10, 2011   (FR) .................................... 11 60248

(51) Int. Cl.
*H04L 7/00* (2006.01)
*H04B 7/02* (2006.01)
(Continued)

(52) U.S. Cl.
CPC ........... *H04L 7/0016* (2013.01); *H04B 7/026* (2013.01); *H04B 7/0857* (2013.01);
(Continued)

(58) Field of Classification Search
CPC . H04L 7/0016; H04L 29/08018; H04B 7/026; H04B 7/0857; H04B 7/15592; H04B 17/391; H04W 88/08
See application file for complete search history.

(56) References Cited

U.S. PATENT DOCUMENTS 7,209,455 B2 *   4/2007   Yee ...................... H04B 7/2603
                                                    370/310.1
7,580,715 B2 *   8/2009   Gorsuch ................. H04J 13/16
                                                    370/335
(Continued)

OTHER PUBLICATIONS

Wang, et al., "High-Performance Cooperative Demodulation With Decode-and-Forward Relays"; IEEE Transactions on Communications, vol. 55, No. 7, Jul. 2007; pp. 1427-1438.
(Continued)

*Primary Examiner* — Parth Patel
*Assistant Examiner* — Kai Chang
(74) *Attorney, Agent, or Firm* — St. Onge Steward Johnston & Reens, LLC

(57) ABSTRACT

An access network for terminals of a digital telecommunications system includes base stations adapted for receiving radiofrequency signals emitted by the terminals, each terminal a physical layer processing module adapted to form a radiofrequency signal on the basis of binary data in accordance with a predefined physical layer protocol. Moreover, for at least one base station, termed the "partial station", an inverse physical layer processing, making it possible to extract binary data from a radiofrequency signal, is distributed between the partial station and a processing server distinct from the partial station, an inverse physical layer processing module being made up of a first inverse processing module, integrated into the partial station, and a second
(Continued)

inverse processing module, integrated into the processing server. The invention also relates to a method of digital telecommunications.

15 Claims, 6 Drawing Sheets

(51) Int. Cl.
  *H04B 7/08* (2006.01)
  *H04B 7/155* (2006.01)
  *H04B 17/391* (2015.01)
  *H04W 88/08* (2009.01)

(52) U.S. Cl.
  CPC ....... *H04B 17/391* (2015.01); *H04B 7/15592* (2013.01); *H04W 88/08* (2013.01)

(56) References Cited

U.S. PATENT DOCUMENTS

| | | | | |
|---|---|---|---|---|
| 2007/0189261 A1* | 8/2007 | Choi | ........... | H04W 36/18 370/347 |
| 2007/0262863 A1* | 11/2007 | Aritsuka | ........... | H04B 17/27 340/539.22 |
| 2008/0125176 A1* | 5/2008 | Kojima | ........... | H04B 7/0857 455/561 |
| 2008/0198831 A1* | 8/2008 | Zhang | ........... | H04W 16/04 370/342 |
| 2008/0299896 A1 | 12/2008 | Mohebbi | | |
| 2008/0318589 A1* | 12/2008 | Liu | ........... | H04W 88/08 455/453 |
| 2009/0036051 A1* | 2/2009 | Horiuchi | ........... | H04B 7/155 455/7 |
| 2009/0061920 A1* | 3/2009 | Horiuchi | ........... | H04L 5/0044 455/522 |
| 2009/0067628 A1* | 3/2009 | Pudney | ........... | H04L 63/0853 380/247 |
| 2010/0159945 A1* | 6/2010 | Brisebois | ........... | H04W 4/02 455/456.1 |
| 2010/0182954 A1* | 7/2010 | Ulrich | ........... | H04W 16/32 370/328 |
| 2010/0208658 A1* | 8/2010 | Vesterinen | ........... | H04W 8/082 370/328 |
| 2010/0265867 A1* | 10/2010 | Becker | ........... | H04W 72/005 370/312 |
| 2010/0273432 A1* | 10/2010 | Meshkati | ........... | H04W 16/16 455/67.11 |
| 2011/0019774 A1* | 1/2011 | Furuta | ........... | G06F 8/65 375/340 |
| 2011/0212716 A1* | 9/2011 | Hosono | ........... | H04W 24/02 455/418 |
| 2011/0244828 A1* | 10/2011 | Hsieh | ........... | H04W 36/04 455/411 |
| 2011/0268033 A1* | 11/2011 | Boldi | ........... | H04B 7/022 370/328 |
| 2012/0252521 A1* | 10/2012 | Nagaraja | ........... | H04W 52/243 455/522 |
| 2012/0302267 A1* | 11/2012 | Haines | ........... | H04L 12/2825 455/466 |
| 2013/0295926 A1* | 11/2013 | Michel | ........... | H04W 36/0061 455/434 |

OTHER PUBLICATIONS

International Search Report Application No. PCT/EP2012/072319 Completed: Jan. 9, 2013; Mailing Date: Jan. 21, 2013 3 pages.
Luo, et al.; "New Approaches for Cooperative Use of Multiple Antennas in AD HOC Wireless Networks"; Sep. 2004; (1 page abstract only).

* cited by examiner

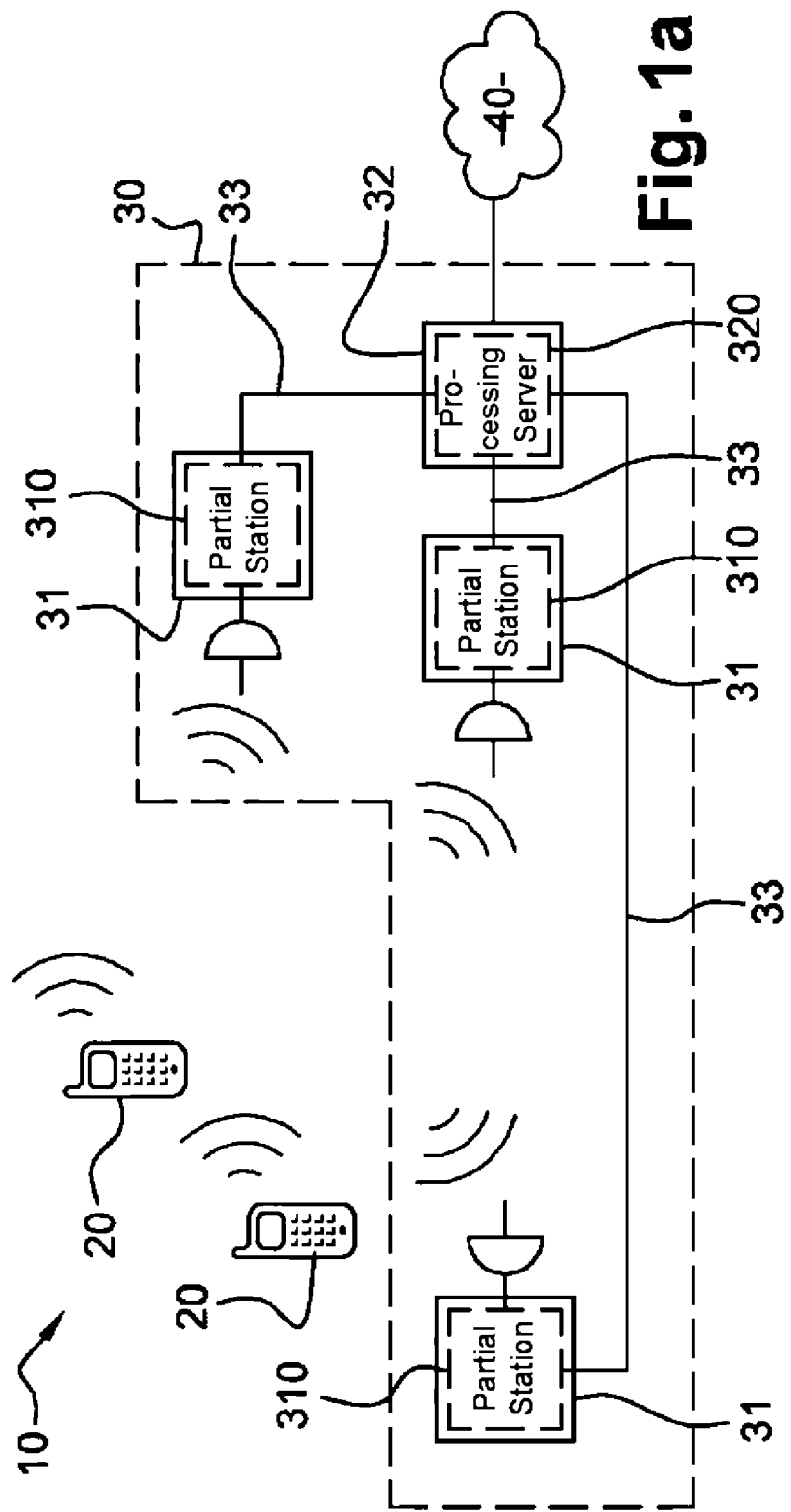

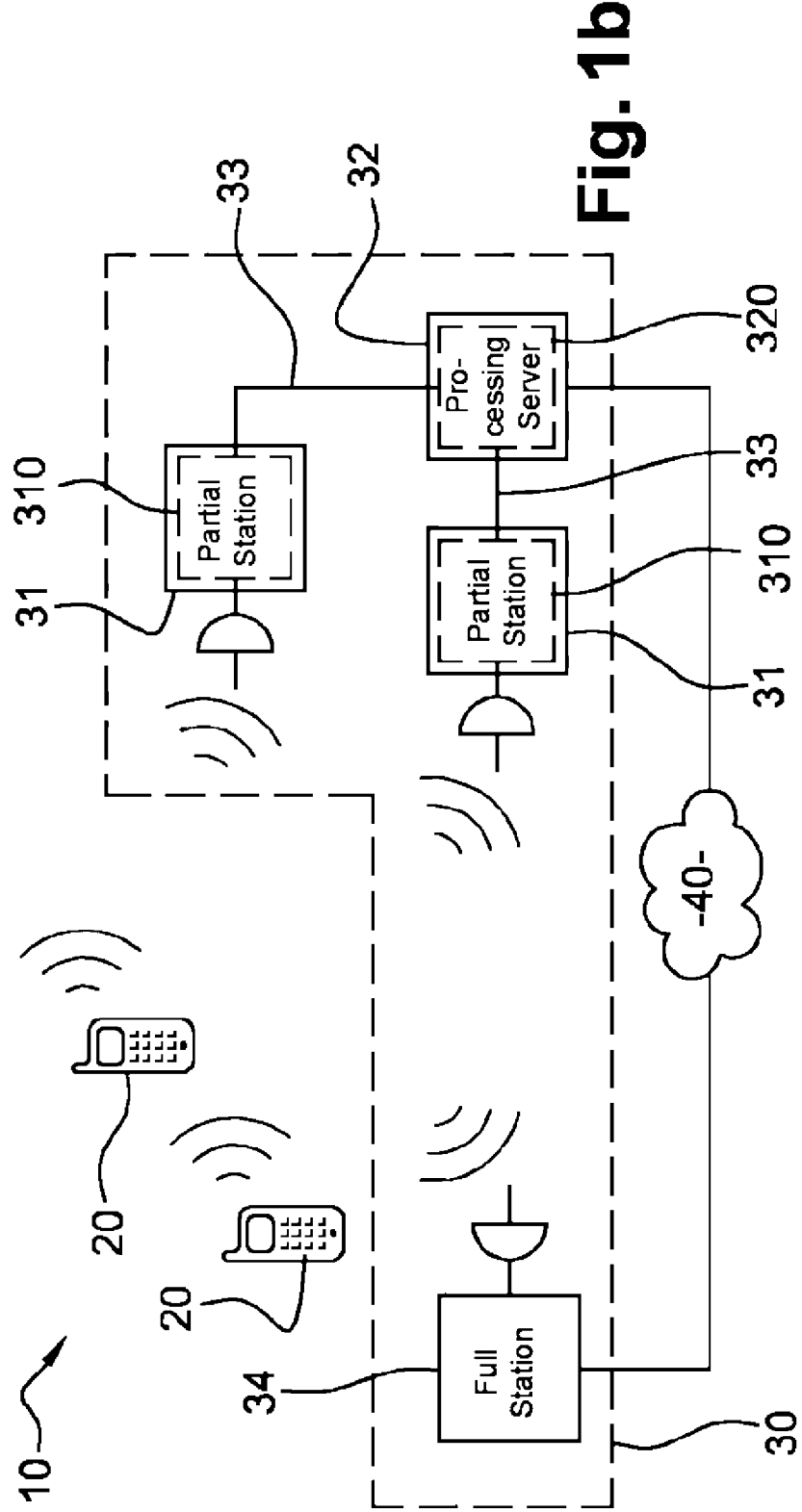

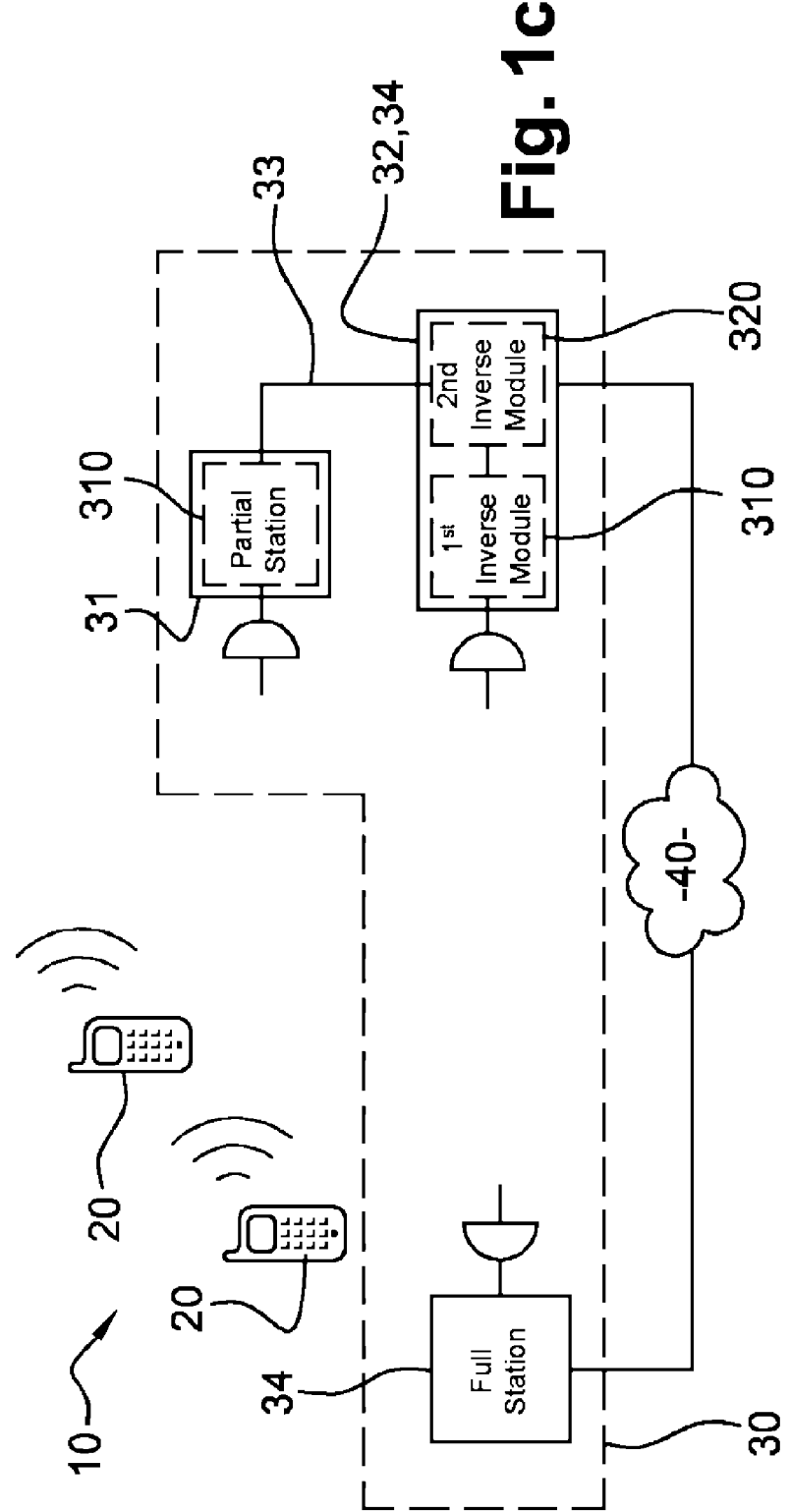

ACCESS NETWORK FOR DIGITAL TELECOMMUNICATIONS SYSTEM AND METHOD OF DIGITAL TELECOMMUNICATIONS

FIELD OF THE INVENTION

The present invention relates to the field of digital telecommunications. More specifically, the present invention relates to an access network for terminals of a digital telecommunications system, said access network comprising base stations capable of receiving radiofrequency signals transmitted by said terminals, and possibly capable of transmitting radiofrequency signals towards the terminals.

BACKGROUND OF THE INVENTION

As known, digital telecommunications systems implement, to exchange binary data, a predefined physical layer protocol which particularly aims at converting said binary data into a radiofrequency signal that can be transmitted in a predefined frequency band.

A physical layer protocol generally provides a succession of predefined steps.

In the case of a transfer of binary data from a terminal to a base station, the physical layer protocol provides, on the terminal side, steps applied to a binary data flow. These steps are, in particular, a modulation step, during which the binary data are converted into symbols (for example, BPSK, DBPSK, QPSK, 16QAM, etc.), and a frequency shift step, to obtain a radiofrequency signal centered on a predefined central frequency.

On the base station side, the physical layer protocol provides applying to a radiofrequency signal received from the terminal a processing inverse to that applied in transmit mode. Particularly, the radiofrequency signal should be frequency-shifted to obtain a baseband signal (that is, a signal centered on a substantially zero central frequency). The baseband signal, theoretically corresponding to a symbol sequence, is then demodulated to obtain binary data which, in the absence of errors, are equal to the binary data transmitted by the terminal.

The same steps are applied, in the case of a bidirectional telecommunications system, for a transfer of binary data from a base station to a terminal.

It should be noted that the physical layer protocol may provide many other steps, for example, an error correction coding step, an interlacing step, a filtering step, etc.

Further, such a physical layer protocol generally provides inserting control data intended to ease the inverse physical layer processing.

Indeed, the tasks to be performed in receive mode are by a much greater number than in transmit mode since it is generally necessary to detect whether a radiofrequency signal has been transmitted, to estimate the time of beginning of said radiofrequency signal (time synchronization) and the central frequency of said radiofrequency signal (frequency synchronization), to estimate the propagation channel in order to compensate for its effects, etc.

As a result, there is a large number of inverse processing operations to be performed in receive mode, which requires a high calculation power. This is all the more critical for base stations, which may have to simultaneously receive binary data from several terminals. Further, base stations perform other operations, relative to the processings of protocol layers which use the physical layer services (for example, MAC, TCP/IP, etc.).

SUMMARY OF THE INVENTION

The present invention aims at overcoming all or part of the limitations of prior art solutions, and particularly those discussed hereabove, by providing a solution which enables to decrease the calculation power necessary for the base stations of a digital telecommunications system access network.

Further, the present invention also aims at providing such a solution which enables, in certain cases, to improve the performance of the telecommunications system access network.

For this purpose, and according to a first aspect, the invention relates to an access network for terminals of a digital telecommunications system, said access network comprising base stations capable of receiving radiofrequency signals transmitted by said terminals, each terminal comprising a physical layer processing module capable of forming a radiofrequency signal from binary data in accordance with a predefined physical layer protocol. For at least one base station, called "partial station", an inverse physical layer processing, enabling to extract binary data from a radiofrequency signal formed in accordance with the physical layer protocol, is distributed between said partial station and a processing sever (32) distinct from said partial station. An inverse physical layer processing module is made up, for said partial station, of a first inverse processing module, integrated in said partial station and capable of forming intermediate data from a radiofrequency signal received from a terminal, and a second inverse processing module, integrated in the processing server, and capable of extracting binary data from said intermediate data.

According to specific embodiments, the access network may comprise one or a plurality of the following characteristics, taken alone or according to all technically possible combinations.

In a specific embodiment, the access network comprises at least another first inverse processing module, integrated in the processing server or in another partial station distinct from said processing server, said at least another inverse processing module also being associated with the second inverse processing module of the processing server.

In a specific embodiment, each first inverse processing module is configured to include, in the intermediate data, data, estimated by said first inverse processing module, relative to one or a plurality of characteristics of the radiofrequency signal from which said intermediate data are formed, called "signal identification data", and the second inverse processing module of the processing server is configured to identify, by comparison of the signal identification data included in intermediate data received from different first inverse processing modules, the intermediate data corresponding to radiofrequency signals received from a same terminal.

In a specific embodiment, the second inverse processing module of the processing server is configured to combine intermediate data, received from different first inverse processing modules, corresponding to radiofrequency signals received from a same terminal. As a variation, the second inverse processing module of the processing server is configured to perform a selection of intermediate data from among intermediate data, received from different first inverse processing modules, corresponding to radiofrequency signals received from a same terminal.

According to a second aspect, the invention relates to a method of digital telecommunications between a terminal and an access network, comprising a step of forming, by the terminal, of a radiofrequency signal from binary data in accordance with a predefined physical layer protocol, and a step of extraction, by the access network and by applying an inverse physical layer processing, of binary data from the radiofrequency signal received from the terminal. According to the invention, for at least one base station of the access network, called "partial station", the inverse physical layer processing is distributed between said partial station and a processing server distinct from said partial station, the binary data extraction step comprising the steps of:

forming, by a first inverse processing module of the partial station, of intermediate data from the radiofrequency signal received from the terminal by said partial station, transferring said intermediate data from said partial station to the processing server, extraction, by a second inverse processing module of the processing server, of binary data from said intermediate data.

According to specific implementation modes, the telecommunications method may comprise one or a plurality of the following characteristics, taken alone or according to all technically possible combinations.

In a specific implementation mode, the radiofrequency signal transmitted by the terminal being received by at least two first inverse processing modules of distinct base stations forming intermediate data, said two first inverse processing modules being connected to a same second inverse processing module, the step of extraction by said second inverse processing module comprises identifying the intermediate data formed by different base stations which correspond to radiofrequency signals received from a same terminal.

In a specific implementation mode, the step of extraction by the second inverse processing module comprises combining the intermediate data identified as corresponding to radiofrequency signals received from a same terminal. As a variation, the step of extraction by said second inverse processing module comprises selecting intermediate data from among the intermediate data identified as corresponding to radiofrequency signals received from a same terminal.

In a specific implementation mode, the forming step comprises inserting, into the intermediate data, a parameter representative of a signal-to-noise ratio of the radiofrequency signal, and the combination or the selection of intermediate data formed by different base stations is performed according to said parameters included in said intermediate data.

In a specific implementation mode, the forming step comprises inserting in to the intermediate data, an identification code specific to the base station having formed said intermediate data.

In a specific implementation mode, the forming step comprises inserting, into the intermediate data, data estimated by the first inverse processing module, relative to one or a plurality of characteristics of the radiofrequency signal from which said intermediate data, called "signal identification data", are formed.

BRIEF DESCRIPTION OF THE DRAWINGS

The present invention will be better understood on reading of the following description, given as a non-limiting example, in relation with the drawings, which show:

FIGS. 1a, 1b, and 1c: embodiments of a digital telecommunications system according to the invention.

In these drawings, the same reference numerals from one drawing to another designate the same or similar elements. For clarity, the shown elements are not to scale, unless otherwise mentioned.

DETAILED DESCRIPTION OF THE INVENTION

Figure 2:
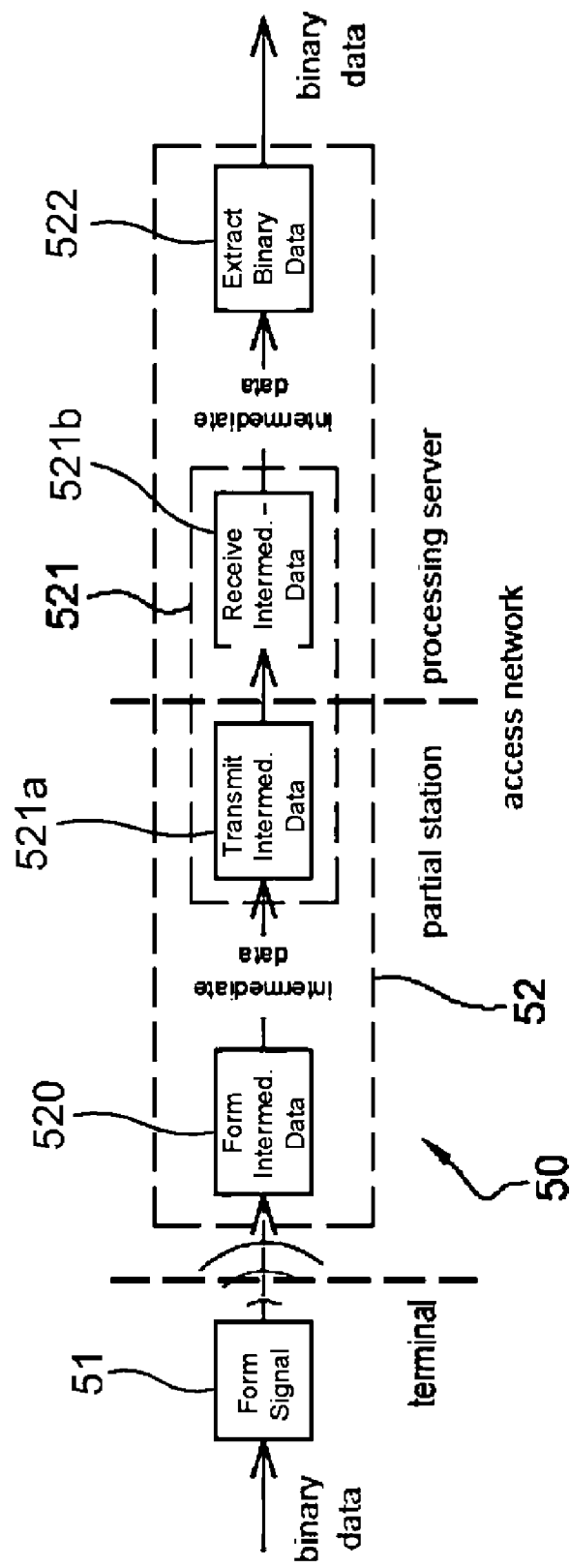
FIG. 2: a diagram illustrating the main steps of a digital telecommunications method according to the invention.

FIG. 1a schematically shows an example of a digital telecommunications system 10 according to the invention. Digital telecommunications system 10 comprises terminals 20 and an access network 30 comprising base stations capable of exchanging radiofrequency signals with terminals 20. Terminals 20 access a network core 40 via said access network 30.

"Terminal" designates any object capable of communication with an access network 30 of a digital telecommunications system 10. A terminal 20 may be fixed or mobile, and may for example appear in the form of a cell phone, of a laptop computer, of a remote-measurement system sensor, etc.

In the following description, the invention is described in the case where binary data should be transmitted by a terminal 20 towards access network 30. It should however be noted that the invention also applies in the case where binary data should be transmitted in the opposite direction, that is, where they should be transmitted by access network 30 towards a terminal 20.

Each terminal 20 comprises a physical layer processing module capable of forming a radiofrequency signal from binary data according to a predefined physical layer protocol. Access network 30 carries out, in accordance with said predefined physical layer protocol, the inverse processing, to extract the binary data transmitted by a terminal 20 according to radiofrequency signals received from a base station of access network 30.

According to the invention, for at least one base station of access network 30, called "partial station" 31, the inverse processing is distributed between said partial station 31 and a processing server 32 of access network 30, said processing server being distinct from said partial station.

"Distinct" means that partial station 31 and a processing server are two different pieces of hardware equipment.

Further, processing server 32 may be distant from partial station 31, said processing server 32 and the partial station being then located in different geographical areas, for example, in different buildings, for example, separated by a few hundred meters, or even more.

Partial station 31 comprises for this purpose a first inverse processing module 310 which carries out a first part of the inverse physical layer processing operations. First inverse processing module 310 accordingly forms intermediate data from a radiofrequency signal received form a terminal 20, said intermediate data being different from the binary data to be extracted.

Processing server 32 comprises a second inverse processing module 320, which carries out a second part of the inverse physical layer processing operations. Second inverse processing module 320 accordingly extracts the binary data from the intermediate data received from first inverse processing module 310. The binary data extracted by second inverse processing module 320 being, in the absence of errors, equal to the binary data transmitted by terminal 20.

It should thus be understood that the intermediate data correspond to data obtained, during the inverse physical layer processing, between the radiofrequency signal and the binary data. The intermediate data are accordingly different both from the radiofrequency signal and from the binary data, since:
- the intermediate data are obtained from the radiofrequency signal by applying a first part of the inverse physical layer processing operations,
- the binary data are obtained from the intermediate data by applying a second and last part of the inverse physical layer processing operations.

Partial station 31 and processing server 32 each comprise transfer means 33 which transfer the intermediate data from said partial station 31 to said processing server 32. Any type of adapted transfer means 33 may be used, and it should be understood that the selection of a type of specific transfer means 33 is only a variation of implementation of the invention. Particularly, said transfer means 33 may comprise wired or wireless or combined wired/wireless communication means.

In the example illustrated in FIG. 1a, all base stations are partial stations 31 connected to a same processing server 32, so that second inverse processing module 320 of processing server 32 is used by several partial stations 31. In other words, inverse physical layer processing operations subsequent to those carried out by the first inverse processing modules 310 of the different partial stations are all centralized at the level of second inverse processing module 320 of processing server 32.

FIG. 1b shows a second example of a telecommunications system 10 comprising both partial stations 31 connected to a processing server 32, and at least one base station, called "full station" 34, capable of carrying out all inverse physical layer processing operations. Full station 34 is directly connected to the core of network 40.

FIG. 1c shows a variation of FIG. 1b, where processing server 32 is a full station 34, that is, comprising both a first inverse processing module 310 and a second inverse processing module 320, having said inverse processing module 320 also used by partial stations 31.

It should be noted that nothing excludes having, in digital telecommunications system 10 according to the invention, several processing servers 32. Thus, each partial station 31 is for example connected to one of processing servers 32, or to a plurality of processing servers 32 for redundancy purposes (should a processing server 32 break down).

FIG. 2 shows the main steps of a digital telecommunications method 50 according to the invention.

As known, digital telecommunications system 50 comprises a step 51 of forming, by a terminal 20, of a radiofrequency signal from binary data in accordance with the predefined physical layer protocol, and a step 52 of extraction, by access network 30, of said binary data from the radiofrequency signal received from said terminal 20.

As previously indicated, binary data extraction step 52 comprises, according to the invention, the steps of:
- 520 forming, by a partial station 31, of intermediate data from the radiofrequency signal received from terminal 20 by said partial station,
- 521 transferring said intermediate data from said partial station 31 to processing server 32,
- 522 extraction, by processing server 32, of the binary data from said intermediate data.

Transfer step 521 comprises a step 521a of transmission, by partial station 31, of said intermediate data, and a step 521b of reception, by processing server 32, of said intermediate data.

Figure 3:
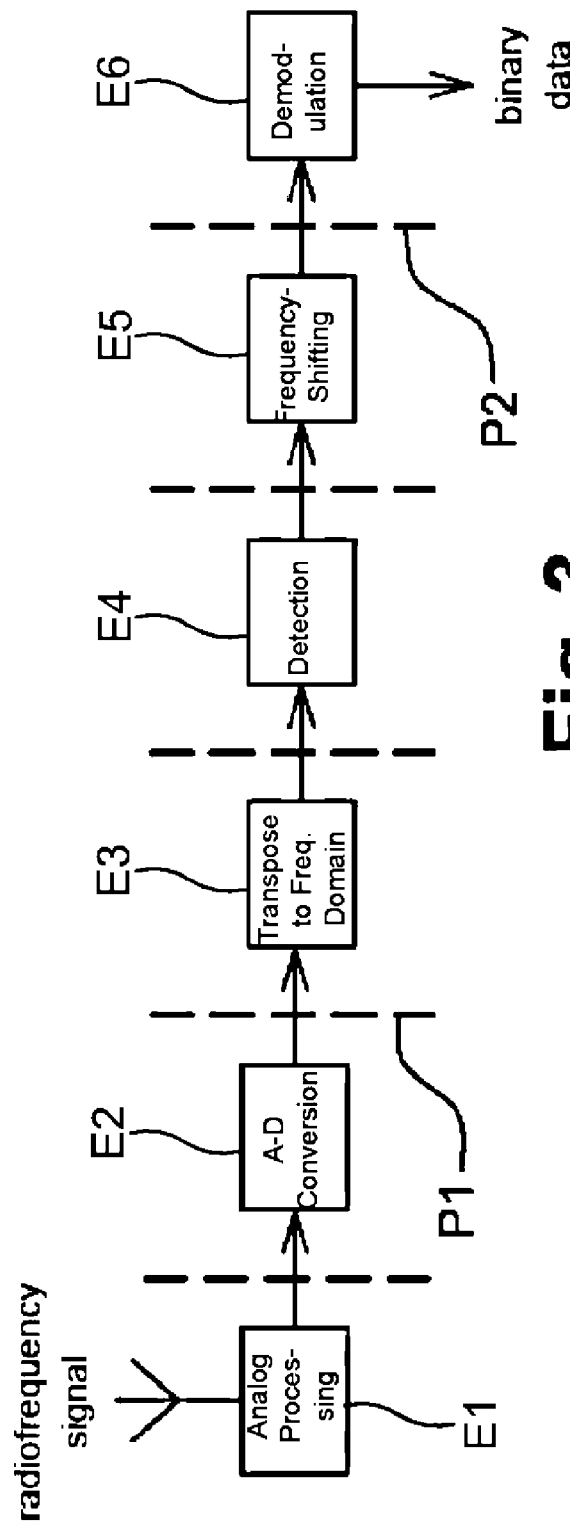
FIG. 3: a diagram illustrating an example of inverse physical layer processing.

FIG. 3 schematically shows a non-limiting example of inverse physical layer processing, adapted to the case where terminals 20 are configured to transit radiofrequency signals in specific frequency sub-bands of a frequency band, called "multiplexing band".

In this example, the inverse physical layer processing first comprises an analog processing step E1. During this step, the radiofrequency signals received by at least one antenna in the multiplexing band are frequency-shifted to obtain an analog signal in the vicinity of an intermediate frequency.

The inverse physical layer processing then comprises an analog-to-digital conversion step E2. During this step, the analog signal is converted into a digital signal by means of analog-to-digital converters.

The inverse physical layer processing then comprises a step E3 of transposition to the frequency domain, during which the digital signal is transposed from the time domain to the frequency domain, to obtain a frequency spectrum of the digital signal. Said transposition to the frequency domain is for example performed by means of an FFT ("Fast Fourier Transform") module.

The inverse physical layer processing then comprises a detection step E4, during which frequencies for which energy peaks capable of corresponding to the presence of a radiofrequency signal transmitted by a terminal 20 are searched for in the frequency spectrum of the digital signal. When a detection criterion is verified, for example, when an energy peak is greater than a predefined threshold value, said energy peak is assumed to correspond to a radiofrequency signal transmitted by a terminal 20, and the central frequency of this radiofrequency signal is estimated.

The inverse physical layer processing the comprises a frequency-shifting step E5 during which the digital signal is taken, according to the central frequency estimated at detection step E4, around a substantially zero central frequency to obtain a so-called "baseband" signal.

The inverse physical layer processing then comprises a demodulation step E6, during which the symbol demodulation is carried out. Indeed, the baseband signal is formed of a sequence of symbols (for example, BPSK, DBPSK, QPSK, 16QAM, etc.) which represent the binary data transmitted by terminal 20. The conversion of this symbol sequence into binary data is carried out at demodulation step E6. In the absence of errors, the binary data obtained after demodulation step E6 are equal to the binary data transmitted by terminal 20.

It should be noted that other operations may be performed during the inverse physical layer processing.

For example, during analog processing step E1, a filtering may be performed to decrease the power of radiofrequency signals outside of the multiplexing band. Further, an automatic gain control (AGC) may also be carried out to match the dynamics of the analog signal with the input dynamics of the analog-to-digital converters. Further, during frequency-shift step E5, the baseband signal may be filtered and sub-sampled, to decrease the quantity of information to be processed during demodulation step E6. During demodulation step E6, other operations may be performed, such as in particular an estimation of the propagation channel, an estimation of a frequency drift capable of affecting the baseband signal, a channel decoding, etc.

The selection of a specific distribution of the inverse physical layer processing operations between first inverse processing module 310 and second inverse processing module 320 is only a variation of implementation of the invention.

Based on the non-limiting example illustrated in FIG. 3, a first example of distribution (separation line P1) comprises assigning radiofrequency processing step E1 and analog-to-digital conversion step E2 to first inverse processing module 310, and assigning all the subsequent steps of second inverse processing module 320.

A second non-limiting example of distribution (separation line P2) comprises assigning all the inverse processing steps to first inverse processing module 310 except for demodulation step E6, which is assigned to second inverse processing module 320. Such a distribution enables to decrease the amount of intermediate data to be transferred, particularly when the baseband signal is filtered and sub-sampled.

Generally, first inverse processing module 310 always performs at least one analog-to-digital conversion step, so that the intermediate data are digital data.

Due to the fact that they do not carry out all the inverse physical layer processing operations (and thus that they do not perform the upper protocol layer processings which use physical layer services), partial stations 31 require less calculation power than full stations 34.

Thus, partial stations 31, having a lower manufacturing cost than full stations 34, may be deployed by a large number to obtain a good coverage of a predefined geographical area. Partial stations 31 will be connected to one or a plurality of processing servers 32 which, although they require a greater calculation power, will be by a lower number than the partial stations.

Further, and as described hereafter, the centralizing of part of the inverse physical layer processing operations will enable, in certain cases, to process, for a same terminal 20, the radiofrequency signals received by distant partial stations 31, and thus to improve the quality of the propagation channel by introducing a space diversity in receive mode.

In the following description, the case where all inverse physical layer processing operations are carried out by first inverse processing modules 310, except for the symbol demodulation (step E6 in FIG. 3), which is performed by a second inverse processing module 320 of processing server 32, is considered, without this being a limitation.

Figure 4:
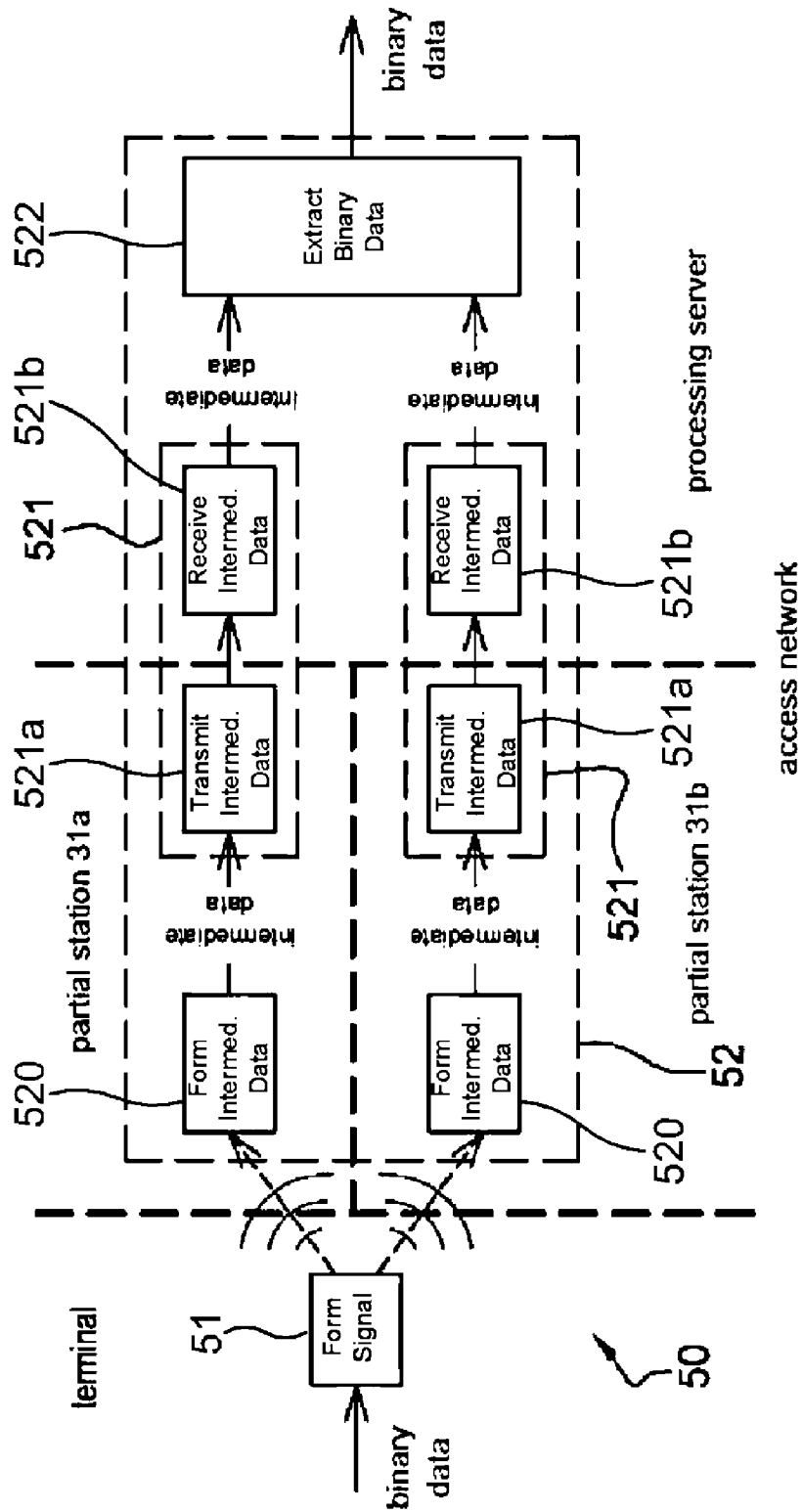
FIG. 4: a diagram illustrating the main steps of a preferred embodiment of a digital telecommunications method according to the invention.

FIG. 4 shows a preferred embodiment of a digital telecommunications method 50 according to the invention.

As compared with the example illustrated in FIG. 2, the case where the radiofrequency signal transmitted by terminal 20 is received by two partial stations 31a and 31b, is considered, without this being a limitation.

What is described hereafter in the case of two partial stations 31a, 31b can also be applied to the case where said radiofrequency signal is received by a partial station 31 and a full station 34 integrating processing server 32. In other words, what is discussed hereafter applies as soon as a second centralized inverse processing module 320 and at least two first inverse processing modules 310 are available in two different base stations, one at least of which is a partial station 31 distant from said second inverse processing module 320.

Each partial station 31a, 31b then executes step 520 of forming intermediate data from the radiofrequency signal that said partial station 31a, 31b has received, as well as transmission step 521a of intermediate data transfer step 521. Processing server 32 executes, for each partial station 31a, 31b, reception step 521b of intermediate data transfer step 521.

Preferably, and for each partial station 31a, 31b, forming step 520 comprises inserting, into the intermediate data transferred to processing server 32, an identification code specific to said partial station having formed said intermediate data.

Due to the presence of an identification code in the intermediate data, processing server 32 may directly determine, from received intermediate data, which intermediate data are received from different partial stations 31a, 31b.

The identification code may take any shape enabling processing server 32 to separate the intermediate data received from different partial stations 31a, 31b. According to a non-limiting example, the identification code of a partial station 31 corresponds to information relative to the position of said partial station 31a, 31b, such as the GPS ("Global Positioning System") coordinates of said partial station. Such an identification code then enables processing server 32 to determine which partial stations 31a, 31b are close and accordingly capable of receiving radiofrequency signals transmitted by a same terminal 20.

Preferably and for each partial station 31a, 31b, forming step 520 comprises inserting, into the intermediate data transferred to processing server 32, data relative to one or a plurality of characteristics of the radiofrequency signal from which said intermediate data are formed, called "signal identification data".

Due to the presence of signal identification data in the intermediate data, processing server 32 can directly determine from intermediate data received from different partial stations which of said intermediate data are likely to correspond to radiofrequency signals received from a single terminal 20.

It should be noted that partial stations 31, when they have formed intermediate data, cannot know offhand the identity of terminal 20 having transmitted the received radiofrequency signal. Indeed, it is not provided, in current physical layer protocols, to assign a physical layer identifier to each terminal 20. Identifiers are provided at the level of upper protocol layers (MAC, IP addresses, etc.) to which partial stations 31 do not have access since they do not perform either the upper protocol layer processings which use the physical layer services.

Certain characteristics of the radiofrequency signal may however allow or ease the identification, at the level of processing server 32, of intermediate data capable of corresponding to radiofrequency signals transmitted by a same terminal 20. However, these characteristics of the radiofrequency signal will generally no longer be available in the intermediate data (for example, the central frequency of the radiofrequency signal is no longer available if the intermediate data correspond to a baseband signal).

The inserting, into the intermediate data, of identification data corresponding to estimated characteristics of the radiofrequency signal thus enables processing server 32 to have information easing the identification of intermediate data corresponding to radio electric signals transmitted by a same terminal 20. Without the insertion of identification data, such information could most often no longer be obtained by said processing server.

Various types of signal identification data may be considered, according to the type of multiplexing used at the physical layer level. For example, if terminals 20 are configured to transmit in different frequency bands, intermediate data forming step 520 may comprise estimating the central frequency of the received radiofrequency signal and inserting this estimation, as signal identification data, in the formed intermediate data. The intermediate data having their central frequencies estimated may be considered as likely to correspond to radiofrequency signals transmitted by a same terminal 20.

As a complement or as a variation, intermediate data forming step 520 may comprise estimating the radiofrequency signal receive time and inserting this estimate, as signal identification data, into the formed intermediate data. The intermediate data having substantially equal estimated receive times can be considered as likely to correspond to radiofrequency signals transmitted by a same terminal 20.

As a complement or as a variation, if terminals 20 are configured to use different spread codes (CDMA, "Code Division Multiple Access"), intermediate data forming step 520 may comprise estimating the spread code used in the received radiofrequency signal and inserting this estimate, as signal identification data, into the formed intermediate data. The intermediate data having equal estimated spread codes can be considered as likely to correspond to radiofrequency signals transmitted by a same terminal 20.

It should thus be understood that, due to the insertion by partial stations 31a, 31b of the partial station identification code and of the signal identification data, processing server 32 is capable of separating the intermediate data received from different partial stations and, among these intermediate data, of identifying which are capable of corresponding to radiofrequency signals received from a same terminal 20.

Accordingly, given that processing server 32 carries out the final operations of the physical layer protocol, in particular the symbol demodulation, said processing server will be capable of using the space diversity in receive mode provided by the different partial stations 31a, 31b.

It should be noted that the space diversity used by the invention is a "spatial macro-diversity" since partial stations 31a, 31b (and accordingly the receive antennas of said partial stations) are located in different geographical areas. In practice, said partial stations 31a, 31b may be spaced apart by a few hundred meters, or even more, so that propagation channels between a terminal 20 and each of said partial stations will generally be statistically independent.

The spatial macro-diversity used by telecommunications system 10 according to the invention should be distinguished from the spatial micro-diversity currently used in certain digital telecommunications systems. Thus, spatial micro-diversity comprises equipping a same base station with a plurality of co-located receive antennas. It should be understood that due to the fact that said receive antennas are co-located, it is difficult to significantly draw them away from one another, so that the propagation channels between a terminal and each of the receive antennas of a same base station will generally be correlated.

It should be noted that nothing excludes, according to the invention, also exploiting spatial micro-diversity by equipping one or several partial stations 31a, 31b with several receive antennas.

To exploit spatial macro-diversity, processing server 32 preferably combines the intermediate data received from different partial stations 31a, 31b identified as corresponding to radiofrequency signals received from a same terminal 20. This combination may be performed according to any known combination method known in the exploitation of spatial micro-diversity in receive mode. For example, such a combination may be performed to maximize the signal-to-noise ratio, such a combination being known as "Maximum Ratio Combining" (MRC).

As a variation, processing server 32 selects intermediate data from among the intermediate data received from different partial stations 31a, 31b identified as corresponding to radiofrequency signals received from a same terminal 20. This selection may be performed according to any selection method known in the exploitation of spatial micro-diversity in receive mode. For example, it is possible to select the intermediate data which have the best signal-to-noise ratio.

To ease the exploiting of spatial macro-diversity in receive mode, forming step 520 preferably comprises inserting, into the intermediate data transferred to processing server 32, at least one parameter representative of a signal-to-noise ratio of the radiofrequency signal. Processing server 32 then combines or selects the received intermediate data according to said parameters included in said intermediate data.

For example, the parameter inserted into the intermediate data corresponds to an estimate of the signal-to-noise ratio, to an estimate of the propagation channel, to an estimate of the receive power, to the gain applied due to the automatic gain control (AGC), etc.

Thus, the intermediate data of partial stations 31a, 31b are shaped according to a predefined intra-physical layer communication protocol.

For example, the intermediate data formed from a radiofrequency signal may be organized in several messages transmitted over a transfer channel between a partial station 31a, 31b and processing server 32. For example, in the case where processing server 32 only carries out the symbol demodulation (step E6 in FIG. 3), the transmitted messages may take the following form.

A first transfer channel initialization message may be transmitted by partial station 31a, 31b, with a format of [Id Fi SNR] type, where:

Id is the partial station identification code,
Fi is the initial central frequency of the radiofrequency signal, and
SNR is the signal-to-noise ratio of the radiofrequency signal.

Then, and for each symbol of the baseband signal, partial station 31a, 31b transmits a message with a format of [Id Tn Fi Fcn n Xn Yn] type, where:

n is the index of the symbol transmitted in this message,
Tn is the receive time of the symbol of index n,
Fcn is the central frequency of the radiofrequency signal at time Tn,
Xn and Yn are the coordinates of the symbol of index n in the complex plane (constellation).

The inserting of current central frequency Fcn is particularly advantageous in the case where the frequency drift of the radiofrequency signals transmitted by a terminal 20 is high. This will particularly occur in telecommunications systems having a narrow band, for example, approximately, from a few Hertz to a few hundred Hertz, where terminals 20 are equipped with inexpensive frequency synthesis means, for which the frequency drift may be greater than the bandwidth of said system.

Inserting initial central frequency Fi in each message enables processing server 32 to identify consecutive messages as corresponding to a same radiofrequency signal. Indeed, initial central frequency Fi does not vary, while central frequency Fcn may vary from one message to another if the frequency drift is significant.

More generally, it should be noted that the embodiments and implementation modes considered hereabove have been described as non-limiting examples, and that other variations may accordingly be envisaged.

In particular, it should be noted that it is possible, according to other examples, to distinguish the intermediate data received from different partial stations 31a, 31b otherwise than by the insertion of an identification code. For example, the intermediate data may be transferred to processing server 32 by means of different communication protocols for which specific addresses are previously assigned to partial stations 31a, 31b and to processing server 32. According to a non-limiting example, the intermediate data are encapsulated in IP ("Internet Protocol") datagrams, and processing server 32 distinguishes the intermediate data received from different partial stations 31a, 31b according to the IP addresses of said partial stations. However, such a distinction, based on the IP address of partial stations 31a, 31b, requires a specific interface enabling second inverse processing module 320 to recover the source IP address of the IP datagram where intermediate data were encapsulated. It should be understood that such a specific interface is not necessary if a partial station identification code is inserted into the intermediate data.

Further, it is possible, according to other examples, to identify the intermediate data likely to correspond to radiofrequency signals transmitted by a same terminal 20 otherwise than by inserting signal identification data. For example, in the case where partial stations 31a, 31b only carry out the operations until the analog-to-digital conversion, most of the inverse physical layer processing being carried out by processing server 32, it should be understood that it is said processing server which can determine signal identification data (central frequency, receive time, etc) to determine whether a radiofrequency signal transmitted by a terminal 20 has been received by a plurality of partial stations 31. According to another example, processing server 32 may use an identifier of terminal 20 inserted into the upper protocol layers (MAC, IP addresses, etc.). However, this imposes for processing server 32 to extract the binary data from the received intermediate data, and to carry out the upper physical layer processing operations before being able to identify which intermediate data are likely to correspond to radiofrequency signals transmitted by a same terminal 20. In a context of combination or selection of the intermediate data, this results in a significant increase of the processing operations carried out by processing server 32.

Further, it is possible, according to other examples, to exploit the macro-diversity without inserting parameters representative of the signal-to-noise ratio. For example, it is possible to pre-compensate, according to the signal-to-noise ratio, the symbols transmitted to processing server 32, so that processing sever 32 will only have to directly combine the symbols or to select the symbols having the greatest amplitude.

The foregoing description clearly illustrates that, by its different features and their advantages, the present invention achieves its aims.

In particular, the distribution of the inverse physical layer processing operations between a partial station and a processing server provides less complex partial stations.

Further, the centralizing of certain inverse physical layer processing operations (in particular, symbol demodulation) at the level of said processing server enables to improve the performance of the digital telecommunications system by exploiting a spatial macro-diversity provided by distant partial stations located in different geographical areas.

What is claimed is:

1. An access network of a digital telecommunications system, said access network comprising base stations capable of receiving radiofrequency signals transmitted by terminals, each terminal comprising a physical layer processing module configured to form a radiofrequency signal from binary data in accordance with a predefined physical layer protocol, said access network being configured to carry out, in accordance with said predefined physical layer protocol, an inverse physical layer processing in order to extract the binary data from a radiofrequency signal received from a terminal by the access network, wherein:
   the access network comprises at least one base station, called "partial station", and a processing server distinct and distant from said partial station;
   the partial station comprises a first inverse processing module configured to carry out a first part of the inverse physical layer processing operations so as to form intermediate data from a radiofrequency signal received from a terminal;
   the processing server comprises a second inverse processing module configured to carry out a second part of the inverse physical layer processing operations so as to extract, from the intermediate data received from the partial station, the binary data, wherein the second part of the inverse physical layer processing operations is different than the first part of the inverse physical layer processing operations;
   the inverse physical layer processing being distributed between said partial station and the processing server such that said partial station carries out the first part of the inverse physical layer processing operations, but not the second part of the inverse physical layer processing operations, and the processing server carries out the second part of the inverse physical layer processing operations, but not the first part of the inverse physical layer processing operations.

2. The access network of claim 1, characterized in that said access network comprises at least another first inverse processing module, integrated in the processing server or in another partial station distinct from said processing server, said at least another inverse processing module also being associated with the second inverse processing module of the processing server.

3. The access network of claim 2, characterized in that:
   each first inverse processing module is configured to include, in the intermediate data, data, estimated by said first inverse processing module, relative to one or a plurality of characteristics of the radiofrequency signal from which said intermediate data are formed, called "signal identification data",
   the second inverse processing module of the processing server is configured to identify, by comparison of the signal identification data included in intermediate data received from different first inverse processing modules, the intermediate data corresponding to radiofrequency signals received from a same terminal.

4. The access network of claim 3, characterized in that the signal identification data comprise an estimate of a central frequency of the radiofrequency signal and/or an estimate of a time of reception of said radiofrequency signal.

5. The access network of claim 2, characterized in that the second inverse processing module of the processing server is configured to combine intermediate data, received from different first inverse processing modules, corresponding to radiofrequency signals received from a same terminal.

6. The access network of claim 2, characterized in that the second inverse processing module of the processing server is configured to select intermediate data from among intermediate data, received from different first inverse processing modules, corresponding to radiofrequency signals received from a same terminal.

7. The access network of claim 1, characterized in that said access network comprises several partial base stations, comprising each a first inverse processing module, connected to the processing server.

8. A method of digital telecommunications between a terminal and an access network, comprising a step of forming, by the terminal, of a radiofrequency signal from binary data in accordance with a predefined physical layer protocol, and a step of extraction, by the access network and by applying an inverse physical layer processing according to said predefined physical layer protocol, of binary data from the radiofrequency signal received from the terminal, wherein the access network comprises at least one base station, called "partial station", and a processing server distinct and distant from the said partial station, and the binary data extraction step comprises the steps of:

forming, by a first inverse processing module of the partial station configured to carry out a first part of the inverse physical layer processing operations, of intermediate data from the radiofrequency signal received from the terminal by said partial station, transferring said intermediate data from said partial station to the processing server, extraction, by a second inverse processing module of the processing server configured to carry out a second part of the inverse physical layer processing operations, of binary data from said intermediate data, wherein the second part of the inverse physical layer processing operations is different than the first part of the inverse physical layer processing operations, such that the inverse physical layer processing is distributed between said partial station and the processing server such that said partial station carries out the first part of the inverse physical layer processing operations, but not the second part of the inverse physical layer processing operations, and the processing server carries out the second part of the inverse physical layer processing operations, but not the first part of the inverse physical layer processing operations.

9. The method of claim 8, characterized in that the radiofrequency signal transmitted by the terminal is received by at least two first inverse processing modules of distinct base stations forming intermediate data, said two first inverse processing modules being connected to a same second inverse processing module, the step of extraction by said second inverse processing module comprises identifying the intermediate data formed by different base stations which correspond to radiofrequency signals received from a same terminal.

10. The method of claim 9, characterized in that the step of extraction by the second inverse processing module comprises combining the intermediate data identified as corresponding to radiofrequency signals received from a same terminal.

11. The method of claim 9, characterized in that the step of extraction by said second inverse processing module comprises selecting intermediate data from among the intermediate data identified as corresponding to radiofrequency signals received from a same terminal.

12. The method of claim 10, characterized in that the forming step comprises inserting, into the intermediate data, a parameter representative of a signal-to-noise ratio of the radiofrequency signal, and in that the combination or the selection of intermediate data formed by different base stations is performed according to said parameters included in said intermediate data.

13. The method of claim 8, characterized in that the forming step comprises inserting, into the intermediate data, an identification code specific to the base station having formed said intermediate data.

14. The method of claim 8, characterized in that the forming step comprises inserting, into the intermediate data, data, estimated by the first inverse processing module, relative to one or a plurality of characteristics of the radiofrequency signal from which said intermediate data called "signal identification data" are formed.

15. The method of claim 14, characterized in that the signal identification data comprise an estimate of a central frequency of the radiofrequency signal and/or an estimate of a time of reception of said radiofrequency signal.

* * * * *